(12) United States Patent
Lu

(10) Patent No.: US 8,127,901 B1
(45) Date of Patent: *Mar. 6, 2012

(54) HYDRAULIC DAMPING DEVICE FOR DRAWER

(75) Inventor: Chun-Min Lu, Taipei Hsien (TW)

(73) Assignee: KV IP Holdings Ltd., George Town, Grand Cayman (KY)

(*) Notice: Subject to any disclaimer, the term of this patent is extended or adjusted under 35 U.S.C. 154(b) by 928 days.

This patent is subject to a terminal disclaimer.

(21) Appl. No.: 11/812,246

(22) Filed: Jun. 15, 2007

(51) Int. Cl.
*F16F 9/34* (2006.01)

(52) U.S. Cl. ............... 188/322.15; 188/282.5; 188/282.6

(58) Field of Classification Search ............... 188/282.6, 188/282.5, 322.15, 282.1, 317, 282.8, 322.17, 188/280, 283, 313, 284
See application file for complete search history.

(56) References Cited

U.S. PATENT DOCUMENTS

| | | | |
|---|---|---|---|
| 2,953,810 A * | 9/1960 | Hall .................................. | 16/52 |
| 2,953,811 A | 9/1960 | Hall | |
| 3,007,550 A * | 11/1961 | Long, Jr. ........................ | 188/280 |
| 3,833,248 A * | 9/1974 | Wossner et al. ............... | 293/134 |
| 3,844,389 A | 10/1974 | De Carbon | |
| 3,937,450 A | 2/1976 | Bauer | |
| 4,030,715 A | 6/1977 | Duran | |
| 4,110,868 A | 9/1978 | Imazaike | |
| 4,113,071 A * | 9/1978 | Muller et al. ............... | 188/282.8 |
| 4,240,619 A * | 12/1980 | Wirges et al. ............... | 267/64.11 |
| 4,310,148 A * | 1/1982 | Freitag .......................... | 267/124 |
| 4,326,733 A * | 4/1982 | Rubalcava ............. | 280/124.158 |
| 4,328,960 A * | 5/1982 | Handke et al. ................ | 267/226 |
| 4,375,843 A * | 3/1983 | Itzinger et al. ........... | 188/322.19 |
| 4,467,899 A | 8/1984 | Molders et al. | |
| 4,503,951 A | 3/1985 | Imaizumi | |
| 4,510,752 A | 4/1985 | Gaiser | |
| 4,689,849 A * | 9/1987 | Eger et al. ......................... | 16/82 |
| 4,736,824 A | 4/1988 | Dony et al. | |
| 4,796,871 A * | 1/1989 | Bauer et al. ................. | 267/64.11 |
| 4,817,238 A * | 4/1989 | Liu .................................... | 16/66 |
| 4,830,152 A | 5/1989 | Rauert et al. | |
| 5,102,109 A * | 4/1992 | Schnetz ........................ | 267/226 |
| 5,259,294 A | 11/1993 | May | |

(Continued)

FOREIGN PATENT DOCUMENTS

GB 2122305 A 1/1984

(Continued)

*Primary Examiner* — Robert Siconolfi
*Assistant Examiner* — Mariano Sy
(74) *Attorney, Agent, or Firm* — Cook Alex Ltd.

(57) ABSTRACT

A hydraulic damping device includes a cylinder holding a hydraulic fluid, a piston rod moving in and out of the cylinder and having a pin at one end inside the cylinder, a rigid valve block affixed to the inner end of the pin of the piston rod and having equiangularly spaced through holes, a retainer affixed to the outer end of the pin of the piston rod, a piston coupled to the pin of the piston rod and movable along the pin between the rigid valve block and the retainer and having a plurality of axially extending through holes, a number of the through holes of the piston being respectively aimed at the through holes of the rigid valve block for allowing the hydraulic fluid to pass through the piston in one direction at a high speed during outward stroke of the piston rod and to pass through the piston in the other direction at a low speed during inward stroke of the piston, and a shock absorber that buffers the impact of the rigid valve block when the piston rod is extended out of the cylinder.

15 Claims, 7 Drawing Sheets

U.S. PATENT DOCUMENTS

| | | | | |
|---|---|---|---|---|
| 5,265,710 | A * | 11/1993 | Gabas et al. | 192/111.12 |
| 5,579,874 | A | 12/1996 | Jeffries et al. | |
| 5,730,260 | A * | 3/1998 | Thyssen | 188/266.5 |
| 5,810,130 | A * | 9/1998 | McCandless | 188/322.22 |
| 5,855,258 | A * | 1/1999 | Deferme | 188/282.6 |
| 6,199,671 | B1 * | 3/2001 | Thyssen | 188/62 |
| 6,247,563 | B1 | 6/2001 | De Carbon et al. | |
| 6,615,450 | B2 * | 9/2003 | Salice | 16/85 |
| 7,032,727 | B2 * | 4/2006 | Vanspauwen | 188/284 |
| 7,628,257 | B1 * | 12/2009 | Lu | 188/282.6 |
| 2003/0132072 | A1 | 7/2003 | Sawai et al. | |

FOREIGN PATENT DOCUMENTS

JP  2005-16691 A  1/2005

* cited by examiner

HYDRAULIC DAMPING DEVICE FOR DRAWER

BACKGROUND AND SUMMARY OF THE INVENTION

The present invention relates to damping devices and more particularly, to a hydraulic damping device for drawer, which buffers the reciprocating motion of the piston rod, allowing the piston rod to be moved out of the cylinder rapidly without much resistance and received into the inside of the cylinder slowly with much resistance. A shock absorber is provided to buffer the impact when the piston rod is extended out of the cylinder.

U.S. Pat. No. 6,615,450B2 discloses an apparatus for the damping of impacts, preferably the impacts of furniture doors or drawers. According to this design, a compression spring is used to impart a damping resistance to the furniture drawer as the piston rod is moved to the inside of the cylinder. When the piston rod is extending out of the cylinder, the tube-section-like part of the compression spring is compressed to absorb shocks, lowering the noise level. However, because the compression spring has a certain length, it may cause an unsmooth movement of the piston rod.

The present invention has been accomplished under the circumstances in view. It is one object of the present invention to provide a hydraulic damping device for drawer, which imparts a high damping resistance to the piston rod as the piston rod is moved toward the inside of the cylinder, smoothening the return stroke of the piston rod. It is another object of the present invention to provide a hydraulic damping device for drawer, which allows the piston rod to be extended out of the cylinder at a high speed without much resistance and, which uses a shock absorber to absorb shocks and to buffer the impact when the piston rod is extended out of the cylinder, thereby lowering the noise level.

To achieve these and other objects of the present invention, the hydraulic damping device comprises a cylinder holding a hydraulic fluid, a piston rod moving in and out of the cylinder and having a pin at one end inside the cylinder, a rigid valve block affixed to the inner end of the pin of the piston rod and having equiangularly spaced through holes, a retainer affixed to the outer end of the pin of the piston rod, a piston coupled to the pin of the piston rod and movable along the pin between the rigid valve block and the retainer and having a plurality of axially extending through holes, a number of the through holes of the piston being respectively aimed at the through holes of the rigid valve block for allowing the hydraulic fluid to pass through the piston in one direction at a high speed during outward stroke of the piston rod and to pass through the piston in the other direction at a low speed during inward stroke of the piston, and a shock absorber that buffers the impact of the rigid valve block when the piston rod is extended out of the cylinder.

DETAILED DESCRIPTION OF THE INVENTION

Figure 1:
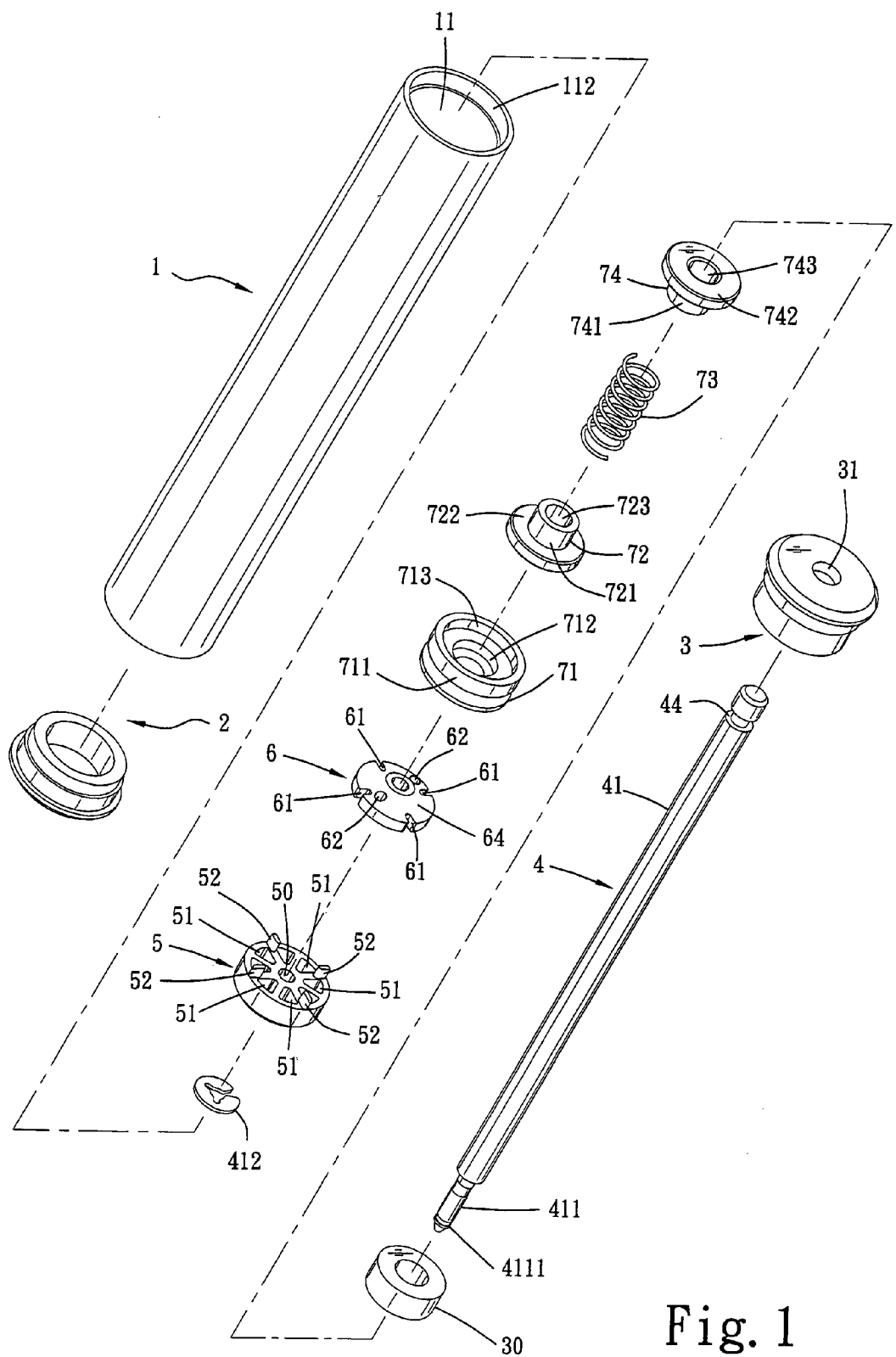
FIG. 1 is an exploded view of a hydraulic damping device for drawer according to the present invention.

Referring to FIGS. 1-7, a hydraulic damping device for drawer in accordance with the present invention is shown comprised of a cylinder 1, a front cap 2, a rear cap 3, a piston rod 4, a piston 5, and a rigid valve block 6.

The cylinder 1 has a cylindrical peripheral wall 11 in which the piston 5 is moved with the piston rod 4 forwards/backwards, a front opening 111 defined in one end of the cylindrical peripheral wall 11 (see FIG. 7), and a rear opening 112 defined in the other end of the cylindrical peripheral wall 11.

Figure 3:
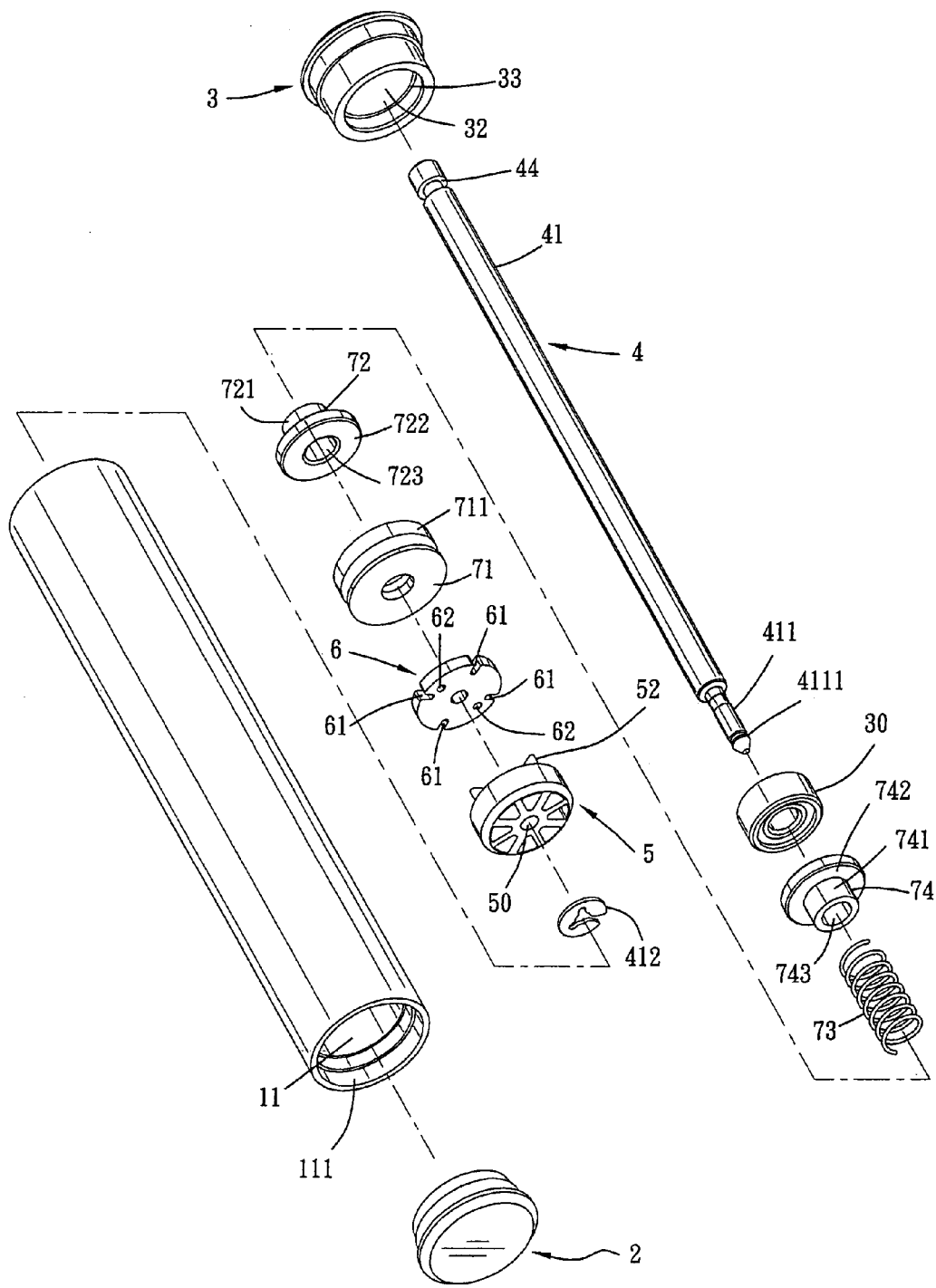
FIG. 3 corresponds to FIG. 1 when viewed from another angle.
Figure 4:
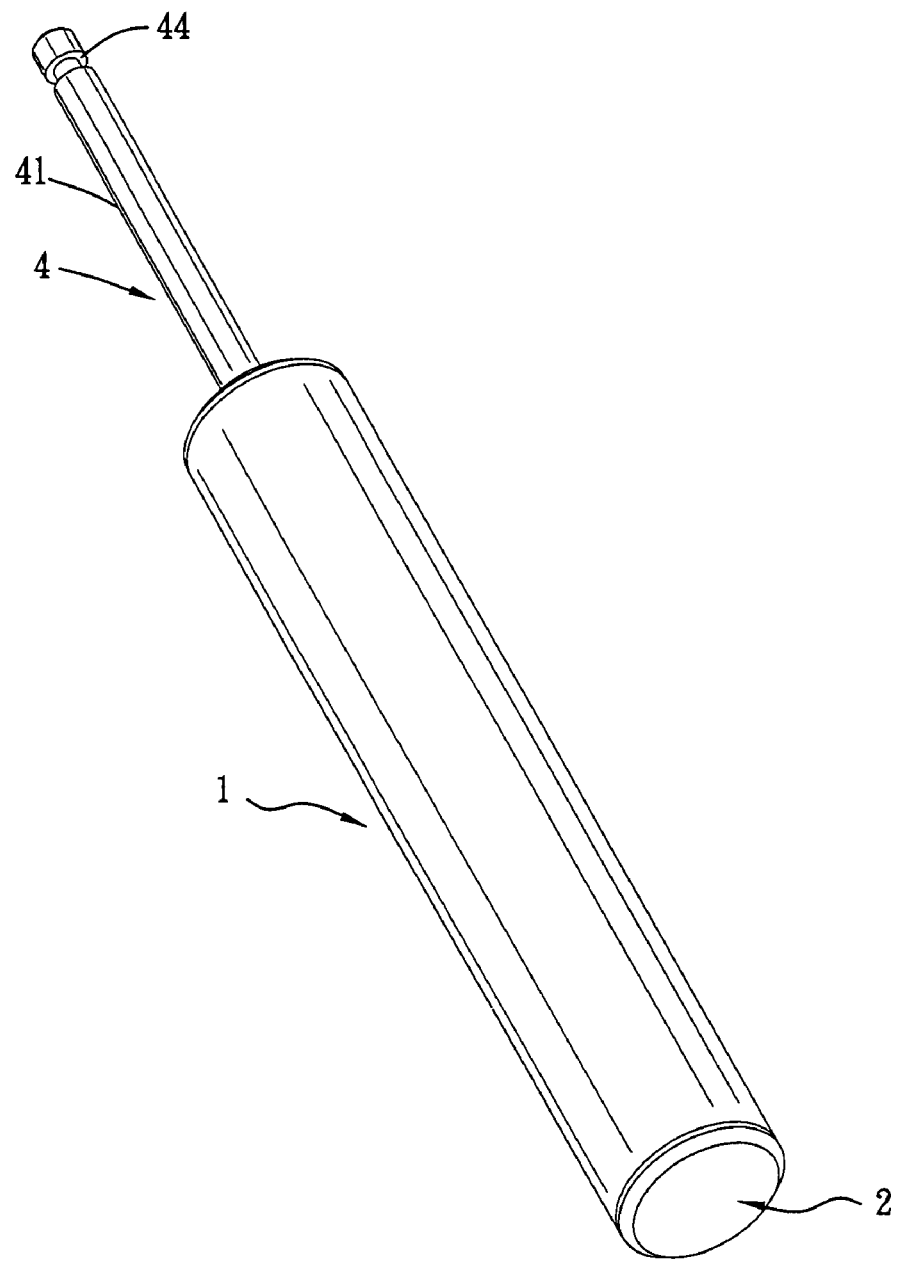
FIG. 4 corresponds to FIG. 2 when viewed from another angle.
Figure 5:
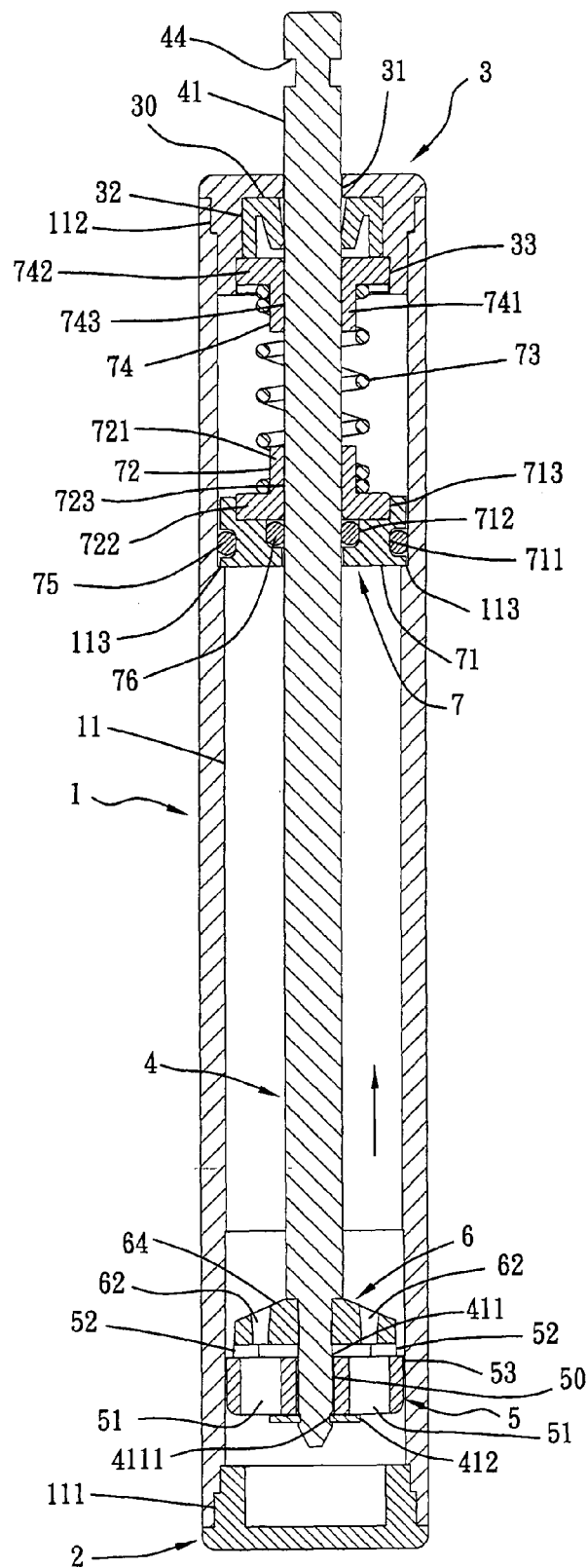
FIG. 5 is a sectional view of the present invention, showing the piston kept apart from the rigid valve block.
Figure 6:
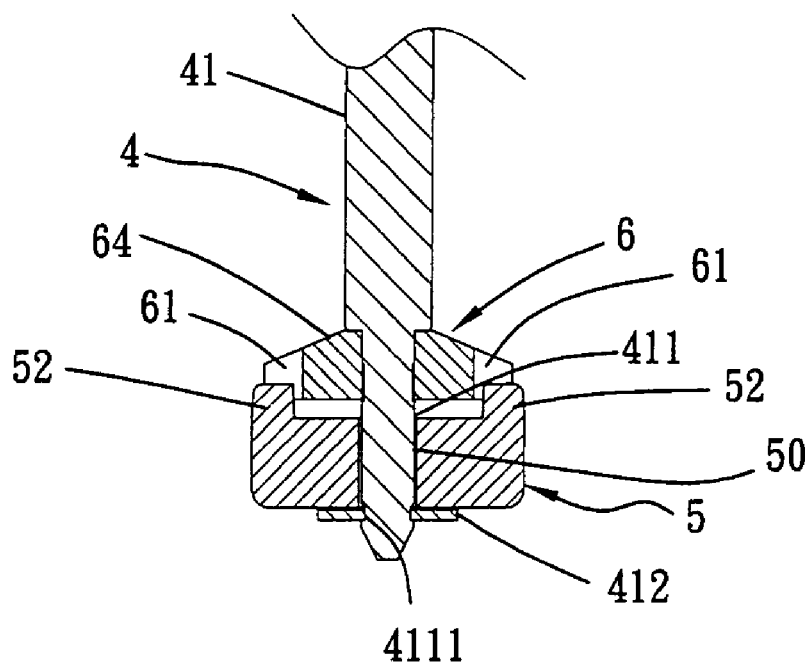
FIG. 6 is a sectional view of a part of the present invention, showing the piston kept apart from the rigid valve block.
Figure 7:
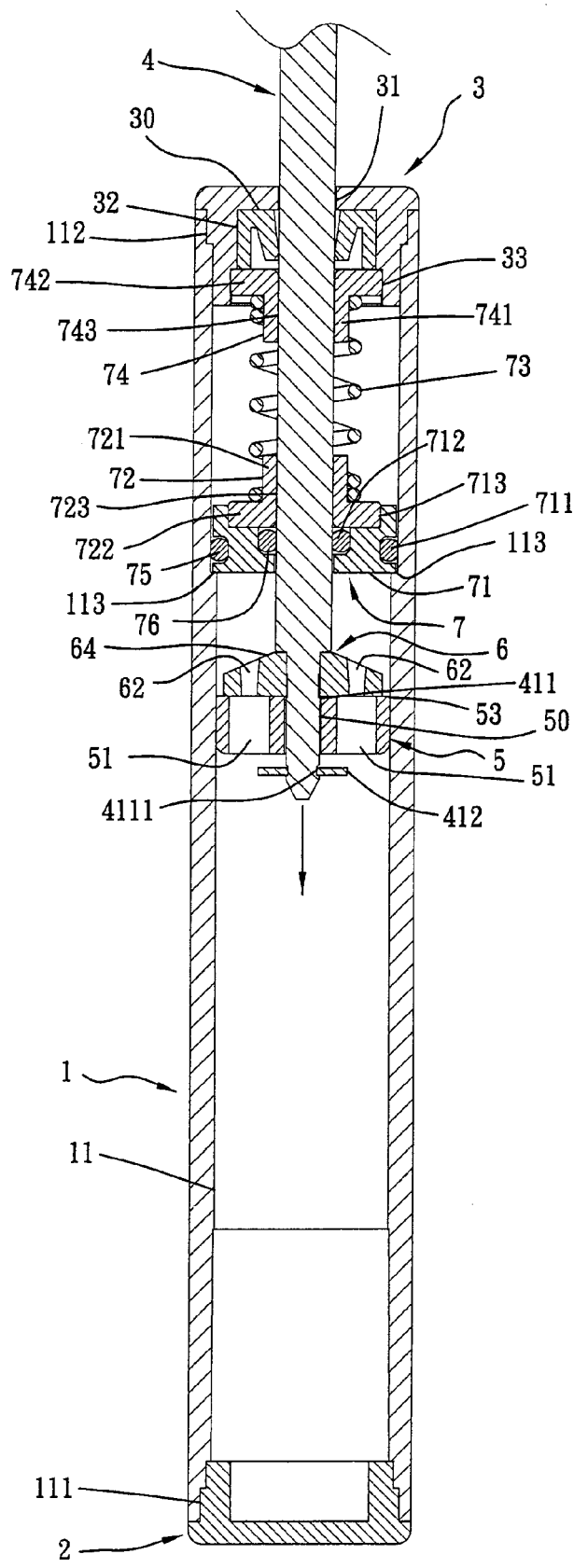
FIG. 7 is a schematic sectional view of the present invention, showing the piston stopped against the rigid valve block.

The front cap 2 is sealed to the cylindrical peripheral wall 11 of the cylinder 1 by, for example, an ultrasonic sealing process to close the front opening 111 after filling of a hydraulic fluid in the cylinder 1 (see FIGS. 3 and 7).

Figure 2:
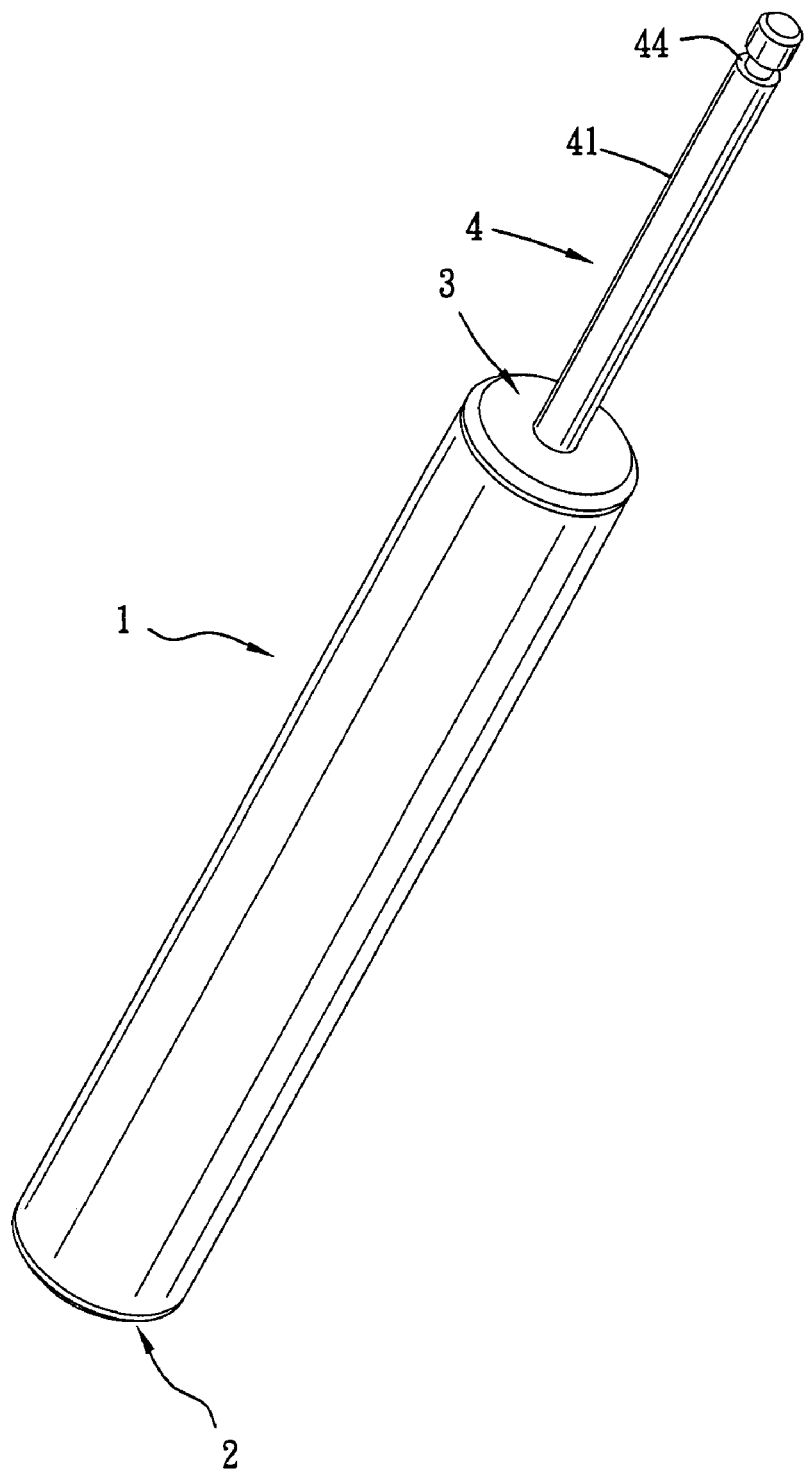
FIG. 2 is an elevational assembly view of the hydraulic damping device for drawer according to the present invention.

The rear cap 3 is sealed to the rear opening 112 of the cylinder 1 by, for example, an ultrasonic sealing process to close the front opening 111, having a bottom accommodation chamber 32, an inside annular groove 33 within the bottom accommodation chamber 32, and a center axle hole 31 in communication with the bottom accommodation chamber 32 for the passing of the piston rod 4 (see FIGS. 1-3). Further, a gasket ring 30 is press-fitted into the bottom accommodation chamber 32 of the rear cap 3 around the piston rod 4 to seal the gap between the piston rod 4 and the rear cap 3.

The piston rod 4 has a rod body 41 inserted through the gasket ring 30 and the center axle hole 31 of the rear cap 3, and a pin 411 axially extending from one end, namely, the front end of the rod body 41 for the mounting of the rigid valve block 6 and the piston 5. The pin 411 has an annular locating groove 4111 extending around the periphery near the distal (free) end remote from the rod body 41. Further, a retainer 412 is fastened to the annular locating groove 4111 to secure the piston 5 to the pin 411.

The piston 5 is preferably molded from plastics, having an outer diameter slightly smaller than the inner diameter of the cylindrical peripheral wall 11 of the cylinder 1. Further, the piston 5 has a center pivot hole 50 coupled to the pin 411 of the piston rod 4 for allowing movement of the piston 5 along the pin 411 between the retainer 412 and the rigid valve block 6, a plurality of through holes 51 axially extending through the front and rear sides, and a plurality of guide rods 52 axially extending from the rear side.

The rigid valve block 6 is mounted on the pin 411 of the piston rod 4 and affixed to the front end of the rod body 41, having an outer diameter smaller than the outer diameter of the piston 5 and the inner diameter of the cylindrical peripheral wall 11 of the cylinder 1. The rigid valve block 6 further has a plurality of axially extending guide grooves 61 that receive the guide rods 52 of the piston 5 to guide axial movement of the piston 5 along the pin 411 between the rigid valve block 6 and the retainer 412 and to prohibit rotary motion of the piston 5 relative to the rigid valve block 6 and the piston rod 4, and a plurality of through holes 62 axially extending through the front and rear sides (see FIGS. 1 and 6). The through holes 62 of the rigid valve block 6 are respectively aimed some of the through holes 51 of the piston 5, i.e., the number of the through holes 62 of the rigid valve block 6 is smaller than the number of the through holes 51 of the piston 5.

When the piston rod 4 is moved outwards toward the inside of the cylindrical peripheral wall 11 of the cylinder 1, the piston 5 is forced by the damping force of the hydraulic fluid in the cylinder 1 to move forwards along the pin 411 toward the retainer 412 and then is then stopped at the retainer 412. At this time, a gap is defined between the rigid valve block 6 and the rear side 53 of the piston 5 (see FIG. 5), and the hydraulic fluid flows through the through holes 62 of the rigid valve block 6 and the gap between the rigid valve block 6 and the inside wall of the cylindrical peripheral wall 11 of the cylinder 1 and then the through holes 51 of the piston 5 toward the front side (end) of the cylinder 1, and therefore the piston rod 4 with the piston 5 and the rigid valve block 6 move backwards at a high speed without much resistance. When the piston rod 4 is moved inwards toward the outside of the cylindrical peripheral wall 11 of the cylinder 1, the piston 5 is stopped at the front side of the rigid valve block 6 (see FIG. 7), and the hydraulic fluid flows through only some of the through holes 51 of the piston 5 that are respectively aimed at the through holes 62 of the rigid valve block 6, i.e., the piston rod 4 with the piston 5 and the rigid valve block 6 encounter much resistance and move forwards at a low speed, providing the desired buffering effect. In an application example of the present invention, the cylinder 1 is affixed to the outer sliding rail of a sliding track assembly at one side of a sliding box in a furniture (not shown) and the rear end 44 of the piston rod 4 is coupled to the inner sliding rail of the sliding track assembly. When the user opens the sliding box, the piston rod 4 is moved with the sliding track assembly backward toward the outside of the furniture at a high speed without much resistance. On the contrary, when the user pushes the sliding box toward the inside of the furniture, the piston rod 4 receives much damping resistance from the hydraulic fluid that acts upon the piston 5 and the rigid valve block 6, buffering the backward motion of the sliding box.

Further, the rigid valve block 6 has its rear side 64 beveled (or shaped like a cone) to reduce resistance during its backward movement with the piston rod 4. Further, the through holes 62 of the rigid valve block 6 have a diameter gradually increasing in direction from the front side of the rigid valve block 6 toward the rear side of the rigid valve block 6. Therefore, the hydraulic fluid receives less resistance when it flows through the through holes 62 of the rigid valve block 6 in direction from the front side of the rigid valve block 6 toward the rear side of the rigid valve block 6; the hydraulic fluid receives much resistance when it flows through the through holes 62 of the rigid valve block 6 in direction from the rear side of the rigid valve block 6 toward the front side of the rigid valve block 6.

The hydraulic damping device further comprises a shock absorber 7. The shock absorber 7 is comprised of a shock-absorbing reciprocating member 71, a front locating member 72, a spring member 73, a rear locating member 74, a seal ring 75, and a gasket ring 76.

The shock-absorbing reciprocating member 71 is axially movable in the rear part inside the cylindrical peripheral wall 11 of the cylinder 1. The cylindrical peripheral wall 11 of the cylinder 1 has an inside annular step 113 that limits the moving distance of the shock-absorbing reciprocating member 71 in the cylindrical peripheral wall 11 of the cylinder 1. The shock-absorbing reciprocating member 71 has an outside annular locating groove 711 extending around the periphery, an open chamber 713, and a stepped center hole 712 cut through the open chamber 713. Further, the shock-absorbing reciprocating member 71 can be made out of plastics, copper, or any of a variety of other metal materials.

The front locating member 72 comprises a flat base 722 fitted into the open chamber 713 of the shock-absorbing reciprocating member 71, a center through hole 723 cut through the front and rear sides of the flat base 722 for the passing of the rod body 41 of the piston rod 4, and a stub tube 721 perpendicularly extending from one side of the flat base 722 around the center through hole 723.

The spring member 73 according to the present preferred embodiment is a coiled spring sleeved with its one end onto the stub tube 721 of the front locating member 72 and stopped against the flat base 722 of the front locating member 72.

The rear locating member 74 comprises a flat base 742 fitted into the inside annular groove 33 of the rear cap 3 and stopped against the gasket ring 30, a center through hole 743 cut through the front and rear sides of the flat base 742 for the passing of the rod body 41 of the piston rod 4, and a stub tube 741 perpendicularly extending from one side of the flat base 742 around the center through hole 743 and inserted into the other end of the spring member 73.

The seal ring 75 is fastened to the outside annular locating groove 711 of the shock-absorbing reciprocating member 71 and disposed in contact with the inside wall of the cylindrical peripheral wall 11 of the cylinder 1.

The gasket ring 76 is press-fitted into the stepped center hole 712 of the shock-absorbing reciprocating member 71 around the rod body 41 of the piston rod 4.

When the piston rod 4 is extending out of the cylindrical peripheral wall 11 of the cylinder 4 at a high speed, the rigid valve block 6 will be moved with the piston rod 4 to push the shock-absorbing reciprocating member 71, forcing the seal ring 75 to rub against the rear part of the inner surface of the cylindrical peripheral wall 11 of the cylinder 1, and at the same time the front locating member 72 will be moved with the shock-absorbing reciprocating member 71 toward the rear locating member 74 to compress the spring member 73, achieving the desired shock-absorbing effect and lowering the noise level.

Further, the seal ring 75 and the gasket ring 76 prohibit the hydraulic fluid from flowing through the shock-absorbing reciprocating member 71 to the space in the rear part of the cylinder 1 between the rear cap 3 and the shock-absorbing reciprocating member 71.

As stated above, the invention provides a hydraulic damping device for drawer that has the following features and advantages:

1. A high damping resistance is given to the piston rod 4 when the piston rod 4 is moved inwards toward the inside of the cylinder 1, smoothen the inward movement of the piston rod 4.

2. The piston rod 4 receives little resistance when it is moved out of the cylinder 1, and therefore the piston rod 4 can be extended out of the cylinder 1 at a high speed. Further, the shock absorber 7 buffers the impact to lower the noise level when the piston rod 4 is extended out of the cylinder 1 at a high speed.

What is claimed is:
1. A hydraulic damping device comprising:
a cylinder, said cylinder having a front opening in a front end thereof and a rear opening in a rear end thereof;
a front cap sealed to the front opening of said cylinder;
a rear cap sealed to the rear opening of said cylinder, said rear cap having a bottom accommodation chamber, a gasket ring disposed in said bottom accommodation chamber, and a center axle hole in communication with said bottom accommodation chamber;
a hydraulic fluid filled in said cylinder;

a piston rod, said piston rod having a rod body inserted through the gasket ring of said rear cap and extending out of said cylinder, a pin axially extending from one end of said rod body and suspending inside said cylinder, and a retainer connected to said pin remote from said rod body;

a rigid valve block coupled to said pin and stopped against said rod body of said piston rod, said rigid valve block having a diameter smaller than the inner diameter of said cylinder and a plurality of through holes axially extending through front and rear sides thereof; and a piston coupled to said pin and axially movable along said pin between said retainer and said rigid valve block, said piston having an outer diameter smaller than the inner diameter of said cylinder and greater than the outer diameter of said rigid valve block and a plurality of through holes axially extending through front and rear sides thereof, the number of the through holes of said piston being greater than the number of the through holes of said rigid valve block, a number of the through holes of said piston being respectively aimed at the through holes of said rigid valve block.

2. The hydraulic damping device as claimed in claim 1, wherein said pin of said piston rod has an annular locating groove extending around the periphery thereof that engages said retainer.

3. The hydraulic damping device as claimed in claim 1, wherein said piston has a plurality of guide rods perpendicularly extending from the rear side; said rigid valve block has a plurality of guide grooves for receiving the guide rods of said piston to guide reciprocating motion of said piston along said pin.

4. The hydraulic damping device as claimed in claim 1, wherein the rear side of said rigid valve block has a conical shape.

5. The hydraulic damping device as claimed in claim 1, wherein the rear side of said rigid valve block is beveled.

6. The hydraulic damper as claimed in claim 1, further comprising a shock absorber mounted adjacent said rear cap inside said cylinder, said shock absorber adapted to engage said rigid valve block when said piston rod is moved out of said cylinder.

7. The hydraulic damping device as claimed in claim 3, wherein at least one of said plurality of guide rods perpendicularly extending from the rear side of said piston and received in one of said plurality of guide grooves of said rigid valve block prohibits rotation of said piston relative to said rigid valve block.

8. The hydraulic damper as claimed in claim 6, wherein the shock absorber further comprises:

a shock-absorbing reciprocating member axially movably mounted in said cylinder, said shock-absorbing reciprocating member comprising an outside annular locating groove extending around the periphery thereof, an open chamber, and a stepped center hole cut through said open chamber;

a front locating member, said front locating member comprising a flat base engaging said shock-absorbing reciprocating member, a center through hole cut through front and rear sides of said flat base for the passing of said piston rod, and a stub tube perpendicularly extending from one side of the flat base of said front locating member around the center through hole of said front locating member;

a rear locating member, said rear locating member comprising a flat base engaging said rear cap, a center through hole cut through front and rear sides of the flat base of said rear locating member for the passing of said piston rod, and a stub tube perpendicularly extending from one side of the flat base of said rear locating member around the center through hole of said rear locating member;

a spring member disposed between said front locating member and said rear locating member.

9. The hydraulic damping device as claimed in claim 8, wherein the spring member has two opposite ends respectively coupled to the stub tube of said front locating member and the stub tube of said rear locating member and respectively engages the flat base of said front locating member and the flat base of said rear locating member.

10. The hydraulic damping device as claimed in claim 8, wherein said cylinder has an inside annular step that limits the moving distance of said shock-absorbing reciprocating member in said cylinder.

11. A hydraulic damping device comprising:

a cylinder having a front end that is closed and a rear end that includes a center axle hole;

a hydraulic fluid in said cylinder;

a piston coupled to a piston rod and being slidably received within said cylinder, and wherein the piston rod extends outward through the center axle hole in the rear end of said cylinder;

a shock absorber disposed within said cylinder and being adapted to engage said piston when said piston rod is moved to a position extended from said cylinder;

said shock absorber comprising:

a shock-absorbing reciprocating member having an outside diameter and an annular locating groove extending around the periphery thereof with a smaller diameter than said outside diameter of said shock-absorbing reciprocating member, said annular groove having two side walls extending between the smaller diameter of the annular locating groove and the outside diameter of the shock-absorbing reciprocating member, and said shock-absorbing reciprocating member having a center through hole that slidably receives said piston rod;

a spring member disposed between said shock-absorbing reciprocating member and said rear end of said cylinder, wherein said spring member is adapted to be compressed when said piston impacts said reciprocating member as said piston rod is moving to a position extended from said cylinder; and wherein said cylinder has an inside annular step that limits the moving distance of said shock-absorbing reciprocating member in said cylinder.

12. The hydraulic damping device as claimed in claim 11, wherein said shock absorber further comprises:

a front locating member engaging said shock-absorbing reciprocating member and having a center through hole that slidably receives said piston rod;

a rear locating member engaging said rear end of said cylinder and having a center through hole that slidably receives said piston rod; and wherein said front locating member is disposed between said shock-absorbing reciprocating member and said rear locating member, and said spring member is disposed between said front locating member and said rear locating member.

13. The hydraulic damping device as claimed in claim 12, wherein said front locating member further comprises a flat base and a stub tube perpendicularly extending from one side of the flat base and being located around a center through hole in said front locating member, and said rear locating member further comprises a flat base and a stub tube perpendicularly extending from one side of the flat base and being located around a center through hole in said rear locating member.

14. The hydraulic damping device as claimed in claim 13, wherein the spring member has two opposite ends respectively coupled to the stub tube of said front locating member and the stub tube of said rear locating member.

15. The hydraulic damping device as claimed in claim 14, wherein said flat base of said front locating member is fitted into an open chamber in said shock-absorbing reciprocating member and said flat base of said rear locating member is fitted into a rear cap having a center axle hole at the rear end of the cylinder.

* * * * *